(12) United States Patent
Kato et al.

(10) Patent No.: US 10,912,099 B2
(45) Date of Patent: Feb. 2, 2021

(54) COMMUNICATION TERMINAL AND COMMUNICATION METHOD

(71) Applicant: PANASONIC INTELLECTUAL PROPERTY MANAGEMENT CO., LTD., Osaka (JP)

(72) Inventors: Osamu Kato, Fukuoka (JP); Hiroaki Asano, Kanagawa (JP); Hideki Kanemoto, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/545,850

(22) Filed: Aug. 20, 2019

(65) Prior Publication Data

US 2020/0068586 A1    Feb. 27, 2020

(30) Foreign Application Priority Data

Aug. 24, 2018    (JP) .................................. 2018-157647

(51) Int. Cl.
*H04W 72/10* (2009.01)
*H04L 5/00* (2006.01)
(Continued)

(52) U.S. Cl.
CPC .......... *H04W 72/10* (2013.01); *H04L 5/0041* (2013.01); *H04W 64/003* (2013.01); *H04W 72/0453* (2013.01); *H04W 76/15* (2018.02)

(58) Field of Classification Search
CPC ............... H04W 64/003; H04W 72/10; H04W 72/0453; H04W 76/15; H04W 72/04; H04L 5/0041
See application file for complete search history.

(56) References Cited

U.S. PATENT DOCUMENTS

2005/0144295 A1*  6/2005  Tsunoda ............... H04N 21/235
                                                                709/228
2006/0020577 A1*  1/2006  Oshima ............... G01R 31/3193
(Continued)

FOREIGN PATENT DOCUMENTS

JP        2010-147519 A    7/2010

*Primary Examiner* — Syed Ali
(74) *Attorney, Agent, or Firm* — Seed IP Law Group LLP

(57) ABSTRACT

Provided is a communication terminal configured to communicate with base stations, including a memory and a processor. The processor executes a position acquisition task that acquires position information on the communication terminal, an accumulation task that accumulates connection frequency information and discontinuance frequency information that relate to communication with each of the base stations at a position of the communication terminal, a determination task that determines a connection priority for preferentially making a connection to each of the base stations from a position of the communication terminal, based on the connection frequency information and the discontinuance frequency information at the position of the communication terminal, a connection control task that controls a connection to each of one or more base stations, in a descending order of the determined connection priority, and a communication task that performs data communication with the one or more base stations.

7 Claims, 11 Drawing Sheets

(51) Int. Cl.
  *H04W 64/00*   (2009.01)
  *H04W 72/04*   (2009.01)
  *H04W 76/15*   (2018.01)

(56) References Cited

U.S. PATENT DOCUMENTS

| | | | |
|---|---|---|---|
| 2011/0019606 A1* | 1/2011 | Umeda | H04W 24/02 370/315 |
| 2014/0126503 A1* | 5/2014 | Kim | H04W 72/0453 370/329 |
| 2014/0198655 A1* | 7/2014 | Ishii | H04W 28/08 370/235 |
| 2015/0046095 A1* | 2/2015 | Takahashi | A61B 5/6826 702/19 |
| 2015/0245402 A1* | 8/2015 | Mochizuki | H04W 36/22 370/331 |
| 2017/0192075 A1* | 7/2017 | Nakai | G01R 33/4828 |
| 2018/0213427 A1* | 7/2018 | Uemura | H04W 24/10 |
| 2018/0310242 A1* | 10/2018 | Konishi | G08G 1/096716 |
| 2019/0182822 A1* | 6/2019 | Takeda | H04L 67/12 |

* cited by examiner

FIG.3

| (X,Y,Z) | (X1,Y1,Z1) | | | (X2,Y2,Z2) | | | (X3,Y3,Z3) | | | ... |
|---|---|---|---|---|---|---|---|---|---|---|
| Area No. | 6 | | | 10 | | | 3 | | | ... |
| i | 1 | 2 | 3 | 6 | 1 | 2 | 3 | 10 | 4 | ... |
| $a_i$ | 14 | 8 | 6 | 11 | 10 | 9 | 15 | 12 | 5 | ... |

| (X,Y,Z) | (X1,Y1,Z1) | (X2,Y2,Z2) | (X3,Y3,Z3) | ... |
|---|---|---|---|---|
| Area No. | 6 | 10 | 3 | ... |
| $i$ | 1 | 6 | 3 | ... |
| | 2 | 1 | 10 | ... |
| | 3 | 2 | 4 | ... |
| $b_i$ | 5 | 2 | 3 | ... |
| | 6 | 4 | 4 | ... |
| | 3 | 5 | 3 | ... |

T2

COMMUNICATION TERMINAL AND COMMUNICATION METHOD

BACKGROUND OF INVENTION

1. Field of the Invention

The present disclosure relates to a communication terminal and a communication method that determine a base station which is a communication destination according to a position of the communication terminal.

2. Description of the Related Art

Presently, in a high frequency band (for example, a Super High Frequency (SHF) band of 6 to 30 GHz or an Extremely High Frequency (EHF) band of 30 to 300 GHz) (the same is hereinafter true), which is considered as being allocated to the 5-th generation mobile communication system (5G), the ability of a radio wave to propagate in a straight line is enhanced. In this high frequency band, when a communication path between a communication terminal and a base station is blocked by a blocking object such as a person or a body, a reception power in the communication terminal along the communication path is decreased greatly, and communication quality (for example, throughput or a packet error rate) deteriorates greatly. Because of this, there is a high likelihood that communication with the base station will be discontinued.

When the communication with the base station is discontinued, the communication terminal searches for any other base station to which a connection is possibly made, but it takes much time (in other words, the time for the communication terminal to discontinue the communication) to start to communicate with a new base station. In order to avoid this, for example, a method has been proposed in which the communication terminal switches in advance from the base station to which a connection is to be made to any other base station in a case where, based on image interpretation of an image captured by a monitoring camera, it is predictable in advance that blocking occurs on the communication path between the communication terminal and the base station.

Furthermore, as a protective measure against significant degradation in the communication quality described above, in some cases, in wireless communication that uses the high frequency band, an adaptive beamforming technology is used in which a propagation path (more precisely, a propagation path for a radio wave) that uses reflection from a neighboring building, a ceiling, or the like is generated from moment to moment. For example, a technology is known in which, in a wireless communication environment where a change in radio wave intensity occurs due to a movement of a person or an object, a wireless communication path is autonomously reestablished due to automatic adjustment of a wireless parameter, thereby providing a desired communication environment (for example, refer to JP-A-2010-147519 as Patent Literature 1).

Patent Literature 1: JP-A-2010-147519

In the method in which, in a case where it can be predicted in advance that the blocking occurs in the communication terminal path between the communication terminal and the base station, the communication terminal switches in advance to any other base station, the communication terminal needs to continue to search for a base station to which a suitable connection is to be made. For this reason, power consumption by the communication terminal increases.

Furthermore, in the communication that uses the high frequency band described above, when the communication path between the communication terminal and each of the multiple base stations that are installed fixedly is blocked, there is an increasing probability that the communication with each of the base station will be discontinued. Then, with the position of the communication, the communication between the communication terminal and one or more base stations is easy to discontinue (for example, a phenomenon occurs such as one where a blocking object frequently crosses the communication path between the communication terminal and the one or more base stations). When in the communication that uses the high frequency band described above, communication is discontinued, because throughput of the communication terminal decreases remarkably, in a case where the communication terminal is present at a position at which this discontinuance of communication occurs easily, it is also required that the communication path between the communication terminal and the base station is secured. In this respect, it is considered that there is room for an improvement in the related art.

An object of the present disclosure, which is made in view of the situations described above in the related art, is to provide a communication terminal and a communication method that adaptively select a base station in which discontinuance of the communication seldom occurs, suppress a decrease in throughput that accompanies the discontinuance of the communication, and ensure continuance of suitable communication, according to a position of the communication terminal itself, in communication in a high frequency band.

SUMMARY OF INVENTION

According to an aspect of the present disclosure, there is provided a communication terminal that is configured to communicate with i base stations, where i is an integer that is equal to or greater than 2, the communication terminal including: a memory storing instructions; and a processor configured to implement the instructions and execute a plurality of tasks. The tasks includes a position acquisition task that acquires position information on the communication terminal; an accumulation task that accumulates a connection frequency information and discontinuance frequency information that relate to communication with each of the i base stations at a position of the communication terminal; a determination task that determines connection priority for preferentially making a connection to each of the i base stations from the position of the communication terminal, based on the connection frequency information and the discontinuance frequency information at the position of the communication terminal that corresponds to the acquired position information on the communication terminal; a connection control task that controls a connection to each of k base stations, in a descending order of the determined connection priorities, where k is an integer that satisfies $1 \leq k \leq i$; and a communication task that performs data communication with the k base stations.

Furthermore, according to a second aspect of the present disclosure, there is provided a communication method in a communication terminal that is configured to communicate with i base stations, where i is an integer that is equal to or greater than 2, the communication method including: acquiring position information on the communication terminal; accumulating connection frequency information and discontinuance frequency information that relate to communication with each of the i base stations at a position of the communication terminal; determining a connection priority for preferentially making a connection to each of the i base stations from the position of the communication terminal, based on the connection frequency information and the discontinuance frequency information at the position of the communication terminal that corresponds to the acquired position information on the communication terminal; and controlling a connection to each of k base stations, in a descending order of the determined connection priorities, where k is an integer that satisfies 1≤k≤i; and performing data communication with the k base stations.

According to the present disclosure, a base station can be adaptively selected in which discontinuance of the communication seldom occurs, a decrease in throughput that accompanies the discontinuance of the communication can be suppressed, and continuance of suitable communication can be ensured, according to a position of the communication terminal itself, in communication in a high frequency band.

BRIEF DESCRIPTION OF DRAWINGS

FIG. 3 is an example of a number-of-times-of-communication-connection table that is retained in a number-of-times-of-communication-connection storage unit.

FIG. 4 is an example of a number-of-times-of-communication-discontinuance table that is retained in a number-of-times-of-communication-discontinuance storage unit.

DESCRIPTION OF EMBODIMENTS

A communication terminal and a communication method according to an embodiment that is specifically disclosed in the present disclosure will be described in detail below in terms of configuration and operation with appropriate reference to the accompanying drawings. In some cases, a description more detailed than is necessary is omitted. For example, in some cases, a detailed description of an already-known matter is omitted, or a redundant description of substantially the same configuration is not repeated. The reason for this is to avoid unnecessary redundancy of the following description and to help a person of ordinary skill in the art to achieve easy understanding. It is noted that the accompanying drawings and the following description are provided in order for a person of ordinary skill in the art to get a sufficient understanding of the present disclosure, and therefore, this is not intended to impose a limitation on a subject matter that is recited in a claim.

Figure 1:
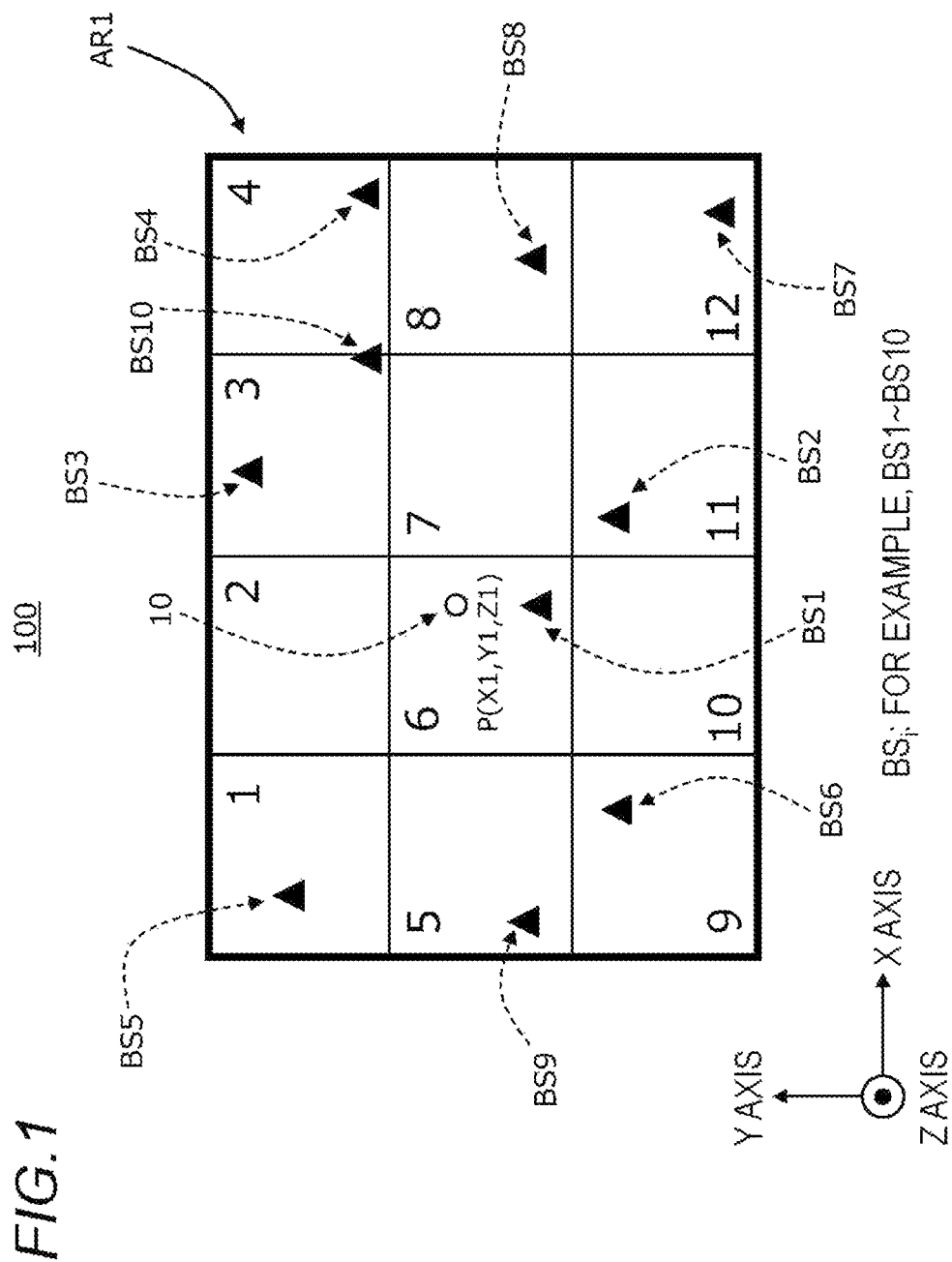
FIG. 1 is a schematic diagram illustrating an example of a communication area where multiple base stations that are communication destinations of a communication terminal according to Embodiment 1.

FIG. 1 is a schematic diagram illustrating an example of a communication area AR1 where multiple base stations, base stations BS1, BS2, BS3, BS4, BS5, BS6, BS7, BS8, BS9, and BS10 are installed, that are communication destinations of a communication terminal 10 according to Embodiment 1. A communication system 100 according to Embodiment 1 is configured to at least include one communication terminal 10 and multiple base stations, BS1 to BS10. When a parameter indicating the number of base stations installed in the communication area AR1 is set to i, i is an integer that is equal to or greater than 2, and in an example in FIG. 1, i=10. However, no limitation to i=10 is imposed. As an example, the communication area AR1 refers to a place (for example, a factory, an intersection, a construction site, a stadium, such as a baseball field or a soccer field, and a main conference hall, such as an international conference room) that has such a space volume that a fixed number of base stations (for example, 10 base stations) are possibly installed, but may be any other area.

The communication area AR1 is configured with adjacent small areas that are 12 sections which results from division. The base station BS1 is installed in a small area with an identification number 6, the base station BS2 is installed in a small area with an identification number 11, the base station BS3 is installed in a small area with an identification number 3, the base station BS4 is installed in a small area with an identification number 4, the base station BS5 is installed in a small area with an identification number 1, the base station BS6 is installed in a small area with an identification number 9, the base station BS7 is installed in a small area with an identification number 12, the base station BS8 is installed in a small area with an identification number 8, the base station BS9 is installed in a small area with an identification number 5, the base station BS10 is installed on the border between the small areas with the identification numbers 3 and 4. It is noted that in an example in FIG. 1, the small areas for categorizing terminal positions are areas that are of the same size and rectangle-sized for easy-to-understand description, but these areas may have different sizes or shapes. Furthermore, it is noted that the communication area AR1 may be a two-dimensional plane area and may also occupy a three-dimensional space following the height direction.

According to a position (for example, a position (X1, Y1, Z1) that is illustrated in FIG. 1) of the communication terminal 10 (more precisely, the communication terminal 10 itself), the communication terminal 10 adaptively makes a connection to at least one of the base stations BS1 to BS10 (for example, the base stations BS1 and BS2, or the base stations BS1 and BS3) through a wireless communication circuit. It is noted that in FIG. 1, for brief description, one communication terminal 10 is illustrated. Furthermore, in the following description, the X axis, the Y axis, and the Z axis in a three-dimensional coordinate system for defining the position of the communication terminal 10 are defined by X-, Y-, and Z-axial directions that are illustrated in FIG. 1.

The communication system 100 configures a network over which each of the base stations BS1 to BS10 that are communication partners to which the communication terminal 10 makes a connection when performing wireless communication is configured to perform wireless communication in compliance with the same wireless standard scheme. In a case where the communication terminal 10 succeeds in making an attempt for communication with each of the base stations BS1 and BS10, the communication terminal 10 starts wireless communication with the resulting base station.

As the wireless communication scheme, a band of 28 GHz whose use in a high frequency band (for example, the 5-th generation mobile station system (5G)) has been under study, or a millimeter wave band (more precisely, a band of 30 GHz to 300 GHz) will be described exemplarily below.

The network that is configured by the communication system 100 may not be a C/U separation type network and may be the C/U separation type network. In Embodiment 1, a network that is not of the C/U separation type is described exemplarily. More precisely, the communication system 100, communication of control data and communication of user data are performed by the same base station.

The base stations BS1 to BS10 each are a small cell base stations that possibly provide high throughput that is based on the band of 28 GHz or the millimeter wave, which are described above, and are installed with high density (refer to FIG. 1). The communication terminal 10 also communicates the control data and communicates the user data with any one of the base stations. The control data includes data relating to Control (C)-Plane. The user data includes information relating to User (U)-Plane. Examples of the user data can include image data (for example, a moving image or a still image), and audio data, and can include a large amount of data.

The C-Plane is a communication protocol for communicating the control data for a call connection and radio resource allocation in wireless communication. The U-Plane is a communication protocol for actually performing communication (for example, video communication, voice communication, or data communication) between the communication terminal 10 and the base station using the allocated radio resource.

A cell radius of each of the base station BS1 and BS10, for example, is 10 m to 100 m, and is comparatively small compared with a macro cell. Radio access technologies that are employable by the base stations BS1 and BS10 are various and many types of them may be present. A range where each of the base stations possibly performs the communication, for example, is determined according to a position of and the cell radius of the base station. Ranges where all base station BS1 to BS10 possibly perform the communication may have the same area and may have different areas.

Radio access technologies (for example, a wireless communication standard and a wireless frequency) that are used by the communication terminal 10 and each of the base stations BS1 to BS10 may be LTE or LTE-Advanced. However, a case in which the communication terminal according to the present disclosure can find application to bring its feature into full play is a case where the 5th mobile communication scheme (5G) or WiGig (a registered trademark) in a band of 60 GHz, which utilizes a high frequency band (for example, a band of 28 GHz, or an EHF band) in which quality of the communication circuit fluctuates greatly due to involvement or disappearance of a blocking object, is employed as the radio access technology. For this reason, in the following description, the radio access technology that is used by the communication terminal 10 and each of the base stations BS1 to BS10 is described with the 5G in the high frequency being exemplary.

Figure 2:
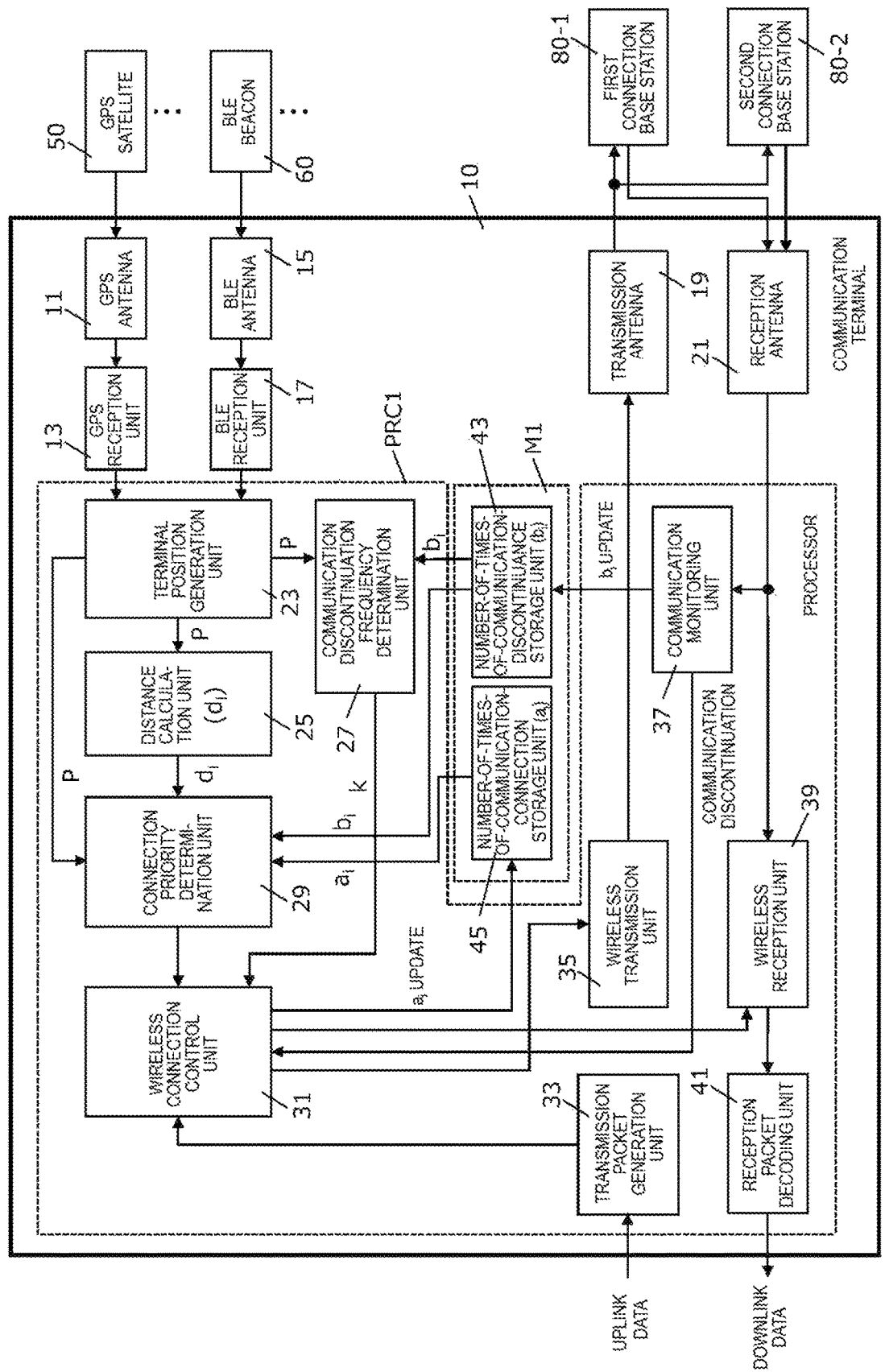
FIG. 2 is a block diagram illustrating an internal configuration of the communication terminal according to Embodiment 1.

FIG. 2 is a block diagram illustrating in detail an example of an internal configuration of the communication terminal 10 according to Embodiment 1. The communication terminal 10 includes a processor PRC1, a memory M1, a Global Positioning System (GPS) antenna 11, a GPS reception unit 13, a Bluetooth (a registered trademark) Low Energy (BLE) antenna 15, a BLE reception unit 17, a transmission antenna 19, and a reception antenna 21. Specifically, the communication terminal 10 is a smartphone that a user carries with him/her, a tablet terminal, a Personal Digital Assistant (PDA), Internet of Things (IoT) equipment, such as a stationary-type sensor or a monitoring camera, or the like. The communication terminal 10 may move in a case where the user carries it with him/her, and may move regardless of whether or not the user carries it with him/her.

The processor PRC1 performs various processing operations and controls in cooperation with the memory M1. Specifically, referring to a program or data that are retained in the memory M1, the processor PRC1 realizes a function or a task of each unit by executing the program. The units include a terminal position generation unit 23, a distance calculation unit 25, a communication discontinuation frequency determination unit 27, a connection priority determination unit 29, a wireless connection control unit 31, a transmission packet generation unit 33, a wireless transmission unit 35, a communication monitoring unit 37, a wireless reception unit 39, and a reception packet decoding unit 41.

The memory M1, for example, has a Random Access Memory (RAM) as a work memory that is used when the communication terminal 10 performs processing, and a Read Only Memory (ROM) in which a program and data that define operation of the communication terminal 10 are stored. Data that is generated or acquired by the processor PRC1, or information is temporarily retained in the RAM. The program that defines the operation of the communication terminal 10 (for example, a communication method that is performed by the communication terminal 10 according to Embodiment 1) is written to the ROM. Furthermore, information on a position (more precisely, coordinates) of each of the base stations BS1 to BS10 that are installed within the communication area AR1 is stored in the memory M1.

Furthermore, the memory M1, as an accumulation unit, includes a number-of-times-of-communication-connection storage unit 45 in which a number-of-times-of-communication-connection table T1 (refer to FIG. 3) is stored, and a number-of-times-of-communication-discontinuance storage unit 43 in which a number-of-times-of-communication-discontinuance table T2 (refer to FIG. 10) is stored. More precisely, the memory M1 may include not only a primary storage device, but also a secondary storage device.

The GPS antenna 11 receives multiple signals, each of which indicates a time and a position (more precisely, coordinates) of each GPS satellite 50, which are transmitted from each of the multiple GPS (for example, three or four) satellites 50, and sends the received multiple signals to the GPS reception unit 13. Each of the GPS satellites 50 transmits the signal indicating the time and the position of each GPS satellite 50.

Based on multiple signals that are received by the GPS antenna 11, the GPS reception unit 13 calculates and acquires position information on the GPS reception unit 13 (more precisely, position information on the GPS reception unit 13 itself). The positional information obtained by this calculation, for example, indicates a current position of the communication terminal 10 that is positioned in a place where a signal is receivable from the GPS satellite 50, and is specifically information that is latitude, longitude, and altitude. It is noted that the GPS reception unit 13 is provided within the processor PRC1. The GPS reception unit 13 sends the position information on the communication terminal 10 obtained by the calculation to the processor PRC1. It is noted that the calculation of the position information on the GPS reception unit 13 may be formed by the terminal position generation unit 23 of the processor PRC1 instead of the GPS reception unit 13. In this case, the signal from each GPS satellite 50, which is received by the GPS antenna 11, is input into the terminal position generation unit 23 through the GPS reception unit 13.

At this point, in a case where the communication terminal 10 is positioned at a position (for example, outdoors) where the signal is receivable from the GPS satellite 50, the reliability of the position information on the communication terminal 10 that is calculated based on signals from multiple GPS satellites 50 is high. However, in a case where the communication terminal 10 is positioned indoors (for example, within a building or in an underground shopping center without being limited to these areas) (the same is hereinafter true) or in the vicinity of a border between the outside and the inside of a building, in some cases, the position information on the communication terminal 10 that is calculated based on the signals from the multiple GPS satellites 50 has a certain error. In this manner, in a case where the communication terminal 10 is positioned indoors or in the vicinity of a border between the outside and the inside of a building, the communication terminal 10 calculates and acquires current position information on the communication terminal itself based on the multiple signals each of which indicates a time and a position (more precisely, coordinates) of each of the BLE beacons 60, which are transmitted from each of the multiple BLE beacons 60 that are installed indoors. For example, in a case where it is determined that a Received Signal Strength Indicator (RSSI) of the signal from the BLE beacons 60 is greater than a prescribed threshold, the communication terminal 10 determines that the communication terminal 10 itself is positioned indoors or in the vicinity of a border between the outside and the inside of a building, and calculates the position information on the communication terminal 10 itself based on the signals that are transmitted from the multiple BLE beacons 60. It is noted that a method of determining that the communication terminal 10 is positioned indoors or in the vicinity of a border between the outside and the inside of a building is not limited to the method that is based on a result of comparison between the received signal strength indicator and the prescribed threshold, which are described above.

The BLE beacons 15 receives the multiple signals each of which indicates the time and the position of each BLE beacon 60 that are transmitted from each of the multiple (for example, two) BLE beacons 60, and sends the received multiple signals to the BLE reception unit 17. Each of the BLE beacons 60 transmits the signal indicating the time and the position of each BLE beacon 60. Furthermore, a distance between each of the BLE beacons 60 is already known. The communication terminal 10 may acquire, in advance, information on a distance between each of the BLE beacons 60 and may acquire such information from an external apparatus (omitted from the figure) (for example, any other communication terminal or any other distance information management server) directly or through a network (which is omitted from the figure).

Based on the multiple signals received by the BLE antenna 15, the BLE reception unit 17 calculates and acquires position information on the BLE reception unit 17 (more precisely, the position information on the communication terminal itself), for example, using a triangulation method. The information on the position obtained by this calculation indicates a current position of the communication terminal 10 that is positioned indoors or in the vicinity of a border between the outside and the inside of a building.

It is noted the BLE reception unit 17 may calculate the position information on the communication terminal 10 positioned indoors or in the vicinity of the outside and the inside of a building using a combination of the multiple signals received by the BLE beacons 15, and a well-known method (for example, Pedestrian Dead Reckoning (PDR) or Pedestrian Map Matching (PMM)).

At this point, because an installed position of each of the BLE beacons 60 is said to have information that consists of latitude, longitude, and altitude, in the same manner as in a case where the communication terminal 10 is positioned outdoors, although the communication terminal 10 is positioned indoors or in the vicinity of a border between the outside and the inside of a building, a method of acquiring the position information in an outdoor environment can be applied extensively to an indoor environment. Because of this, the position information that is the same as latitude, longitude, and altitude can be acquired. It is noted that the BLE reception unit 17 may be provided within the processor PRC1. The BLE reception unit 17 sends the position information on the communication terminal 10, which is obtained by the calculation, to a processor 150. It is noted that the calculation of the position information on the BLE reception unit 17 may be performed by the terminal position generation unit 23 of the processor PRC1 instead of the BLE reception unit 17. In this case, the information from each BLE beacon 60, which is received by the BLE antenna 15, is input into the terminal position generation unit 23 through the BLE reception unit 17.

The transmission antenna 19 transmits a transmission packet (for example, user data) from the wireless transmission unit 35 to one of a first connection base station 80-1 and a second connection base station 80-2, or both. The detail will be described below, but the base station that is the communication destination of the communication terminal 10 is selected and determined by the processor PRC1.

At this point, the first connection base station 80-1 and the second connection base station 80-2 are different base stations that are among the base stations BS1 to BS10 which are illustrated in FIG. 1. In Embodiment 1, when a parameter indicating the number of base stations (hereinafter referred to as "number of concurrently-connected base stations") to which the communication terminal 10 itself makes a connection concurrently for communication is set to k, based on connection frequency information and discontinuance frequency information, which relate to the position of the communication terminal 10 itself at the time of past communication, the communication terminal 10 adaptively sets a parameter (k) in the processor PRC1. k is an integer that satisfies $1 \leq k \leq i$, but for easy-to-understand description, a value that k takes is hereinafter set to 1 or 2.

For example, in a case where k=1, the communication terminal 10 makes a connection to one base station (for example, the base station BS1) of the base stations BS1 to BS10 for communication. Therefore, the communication terminal 10 performs makes a connection for communication with the base station BS1, with the base station BS1 as the first connection base station 80-1, and performs the data communication with the base station B S1.

In the same manner, the communication terminal 10, for example, in a case where k=2, makes a connection for communication with two different base stations (for example, the base station BS1 and BS2) that are among the base stations BS1 to BS10. Therefore, the communication terminal 10 makes concurrent connections for communication with two base stations, the base stations BS1 and the BS2, for example, with the base stations BS1 and BS2 as the first connection base station 80-1 and the second connection base station 80-2, respectively, and performs the data communication with the base stations BS1 and BS2.

The reception antenna 21 receives a reception packet (for example, user data) that is transmitted from one of the first connection base station 80-1 and the second connection base station 80-2, or both, and sends the received reception packet to the processor PRC1.

Next, functional configurations that are realized by the processor PRC1 will be sequentially described in detail.

For example, in a case where the communication terminal 10 is positioned outdoors, based on the information from the GPS reception unit 13, the terminal position generation unit 23, as an example of a position acquisition unit, generates current position information (for example, coordinates P (X1, Y1, Z1)) on the communication terminal 10 itself and sends the generated current position information to each of the distance calculation unit 25, the communication discontinuation frequency determination unit 27, and the connection priority determination unit 29. For example, in a case where the communication terminal 10 is positioned indoors or in the vicinity of a border between the outside and the inside of a building, based on the information from the BLE reception unit 17, the terminal position generation unit 23, as an example of a position acquisition unit, generates current position information (for example, coordinates P (X1, Y1, Z1)) on the communication terminal 10 itself and sends the generated current position information to each of the distance calculation unit 25 and the communication discontinuation frequency determination unit 27.

The distance calculation unit 25 calculates a distance di to every base station between a position P (X1, Y1, Z1) that corresponds to the position information on the calculation terminal, which is sent from the terminal position generation unit 23, and a position $(X_i, Y_i, Z_i)$ a base station BSi that is installed within the calculation area AR1, according to Equation (1). The distance calculation unit 25 sends a result of the calculation of the distance di to every base station to the connection priority determination unit 29. In FIG. 1, because the number of base stations is 10, i ranges from 1 to 10. It is noted that an example of the calculation of the distance di is not limited to a humming distance in Equation (1) and that the distance di may be a Euclid distance in Equation (2).

[Equation 1]

$$d_i = |X1-X_i| + |Y1-Y_i| + |Z1-Z_i| \quad (1)$$

[Equation 2]

$$d_i = \sqrt{(X1-X_i)^2 + (Y1-Y_i)^2 + (Z1-Z_i)^2} \quad (2)$$

It is noted that the distance calculation unit 25 may multiply a specific factor (for example, altitude) at the position (latitude, longitude, altitude) of the communication terminal 10 by a weighting coefficient when computing the distance di (refer to Equation (3)). In Equation (3), a coefficient of "10" for |Z1−Zi| is only an example of the weighting coefficient. Although latitude or longitude at the position information on the communication terminal 10 is the same, when altitude is different, in some cases, a communication environment is greatly different. In such a case, by considering (specifically, multiplying) the weighting coefficient (for example, 10) described above with respect to altitude, the connection priority determination unit 29 can determine connection priority of the base station in accordance with a current position of the communication terminal 10.

[Equation (3)]

$$d_i = |X1-X_i| + |Y1-Y_i| + 10|Z1-Z_i| \quad (3)$$

The communication discontinuation frequency determination unit 27 reads and acquires information that is the number of times of discontinuance (an example of discontinuance frequency information) relating to past communication with every base station at a position P (X1, Y1, Z1) that corresponds to the position information on the communication terminal 10 itself, which is sent from the terminal position generation unit 23, from the number-of-times-of-communication-discontinuance storage unit 43. According to whether or not an average value or maximum value of the acquired number of times of discontinuance relating to communication with every base station is equal to or higher than a prescribed value (for example, 5), the communication discontinuation frequency determination unit 27 determines whether or not communication at the position of the communication terminal 10 itself (for example, communication that uses a millimeter wave or the like that has the enhanced ability of a radio wave to propagate in a straight line) is performed in a place where discontinuance occurs easily. In other words, the communication discontinuation frequency determination unit 27 determines whether or not a current position of the communication terminal 10 is in a place where blocking frequently occurs due to a blocking object or the like while communication with the base station is in progress and thus where it is easy for the discontinuance of the communication to occur.

In a case where it is determined that the average value or maximum value of the number of times of discontinuance described above is equal to or higher than the prescribed value (for example, 5), the communication discontinuation frequency determination unit 27, as an example of the number-of-connection-base-stations setting unit, sets the parameter (k) indicating the number of concurrently-connected base stations to 2. More precisely, in this case, the position of the communication terminal 10 is in a place where the blocking frequently occurs due to a blocking object or the like while the communication with the base station is in progress and thus where it is easy for the discontinuance of the communication to occur. The communication discontinuation frequency determination unit 27 sends information that is a setting value (more precisely, k=2) of the parameter (k) indicating the number of concurrently-connected base stations, to the wireless connection control unit 31.

On the other hand, in a case where it is determined that the average value or maximum value of the number of times of discontinuance described above is lower than the prescribed value (for example, 5), the communication discontinuation frequency determination unit 27, as an example of numberof-connection-base-stations setting unit, sets the parameter (k) indicating the number of concurrently-connected base stations to 1. More precisely, in this case, the position of the communication terminal 10 is in a place where the blocking does not occur due to a blocking object or the like while the communication with the base station is in progress and thus where it is difficult for the discontinuance of the communication to occur. The communication discontinuation frequency determination unit 27 sends information that is a setting value (more precisely, k=1) of the parameter (k) indicating the number of concurrently-connected base stations, to the wireless connection control unit 31.

The connection priority determination unit 29, as an example of a determination unit, reads and acquires information (an example of the connection frequency information) that is the number of times of connection relating to the past communication with every base station at the position P (X1, Y1, Z1) that corresponds to the position information on the communication terminal 10, which is sent from the terminal position generation unit 23, for the number-of-times-of-communication-connection storage unit 45. The connection priority determination unit 29 reads and acquires information (an example of the discontinuance frequency information) that is the number of times of discontinuance relating to the past communication with every base station at the position P (X1, Y1, Z1) that corresponds to the position information on the communication terminal 10, which is sent from the terminal position generation unit 23, from the number-of-times-of-communication-discontinuance storage unit 43.

The connection priority determination unit 29 calculates connection priority for preferentially making a connection to each base station from the position of the communication terminal 10 itself, according to Equation (4), based on a result of the calculation of the distance di to every base station, which is sent from the distance calculation unit 25, and on the number $a_i$ of times of connection and the number $b_i$ of times of discontinuance, which relate to the past communication with every base station at a current position P (X1, Y1, Z1) of the communication terminal 10 itself. The connection priority determination unit 29 sends a result of the determination of the connection priority for preferentially making a connection to each base station from the position of the communication terminal 10 itself, to the wireless connection control unit 31. With Equation (4), the connection priority is calculated as a value of a function in which the shorter the distance di and the greater the number ai of times of connection, the smaller the number bi of times of discontinuance. It is noted that it goes without saying that a specific function in Equation (4) is an example.

[Equation 4]
$$\frac{a_i}{(1+b_i)d_i} \quad (4)$$

At this point, referring to FIGS. 3 and 4, an example of the calculation of the connection priority in the connection priority determination unit 29 is described here.

FIG. 3 is an example of the number-of-times-of-communication-connection table T1 that is retained in the number-of-times-of-communication-connection storage unit 45. FIG. 4 is an example of a number-of-times-of-communication-discontinuance table T2 that is retained in the number-of-times-of-communication-discontinuance storage unit 43.

As illustrated in FIG. 3, an identification number of a corresponding small area, a parameter (i) indicating an identification number of the base station that has a communication history, and the number $a_i$ of times of connection to the base station that corresponds to the parameter i, which is in the past communication history are stored in the number-of-times-of-communication-connection table T1, in a manner that is associated with every position (more precisely, three-dimensional coordinates) of the communication terminal 10. It is noted that, in FIG. 3, in a small area with the identification number 6, the numbers of times of connection that correspond to the base station BS1 corresponding to i=1, the base station BS2 corresponding to i=2, and the base station BS3 corresponding to i=3 are 14, 8, and 6, respectively, but that the number of times of connection to a prescribed number of base stations (for example, three base stations) that has connected a large number of times may be limitedly stored and the number of times of connection to each of all the base stations may be stored. In FIG. 3, three base stations, the base stations BS1, BS2, and BS3 that are connected to a large number of times is illustrated exemplarily.

As illustrated in FIG. 4, the identification number of a small area corresponding to every position (more precisely, three-dimensional coordinates) of the communication terminal 10, the parameter (i) indicating the identification number of the base station that has the communication history, and the number $b_i$ of times of connection to the base station that corresponds to the parameter i, which is in the past communication history, are stored in the number-of-times-of-communication-connection table T2, in a manner that is associated with each other. It is noted that, in FIG. 4, in the small area with the identification number 6, the numbers of times of discontinuance that correspond to the base station BS1 corresponding to i=1, the base station BS2 corresponding to i=2, and the base station BS3 corresponding to i=3 are 5, 6, and 3, respectively, but that the number of times of discontinuance of communication with a prescribed number of base stations (for example, three base stations) that are connected a large number of times may be limitedly stored and the number of times of discontinuance of communication with each of all the base stations may be stored. In FIG. 4, the number of times of discontinuance of communication with each of three base stations, the base stations BS1, BS2, and BS3, is illustrated exemplarily in such a manner as to correspond to each of the three base stations, the base stations BS1, BS2, and BS3 that correspond to the small area with the identification number 6 that is illustrated in FIG. 3.

In a case where a current position of the communication terminal 10 itself is the P (X1, Y1, Z1), the connection priority determination unit 29 acquires ($a_i$, $b_i$, $d_i$)=(14, 5, 3) for the base station BS1 corresponding to i=1, ($a_i$, $b_i$, $d_i$)=(8, 6, 4) for the base station BS2 corresponding to i=2, and ($a_i$, $b_i$, $d_i$)=(6, 3, 6) for the base station BS3 corresponding to i=3, as the number $a_i$ of times of connection and the number $b_i$ of times of discontinuance, which relate to the past communication with every base station at the position P (X1, Y1, Z1), and the distance $d_i$.

According to Equation (4), the connection priority determination unit 29 calculates connection priority of the base station BS1 corresponding to i=1, as "0.78" (=14÷(6×3)), calculates connection priority of the base station BS2 corresponding to i=2, as "0.29" (=8÷(7×4)), and connection priority of the base station BS3 corresponding to i=3, as "0.25" (=6÷(4×6)). For easy-to-understand description, an example of calculating the connection priority of each of three base stations, the base stations BS1, BS2, and BS3 is described here. However, if the number of times of connection to, the number of times of discontinuance of communication with, any other base station, and the corresponding distance $d_i$ can be acquired from the number-of-times-of-communication-connection table T1 and the number-of-times-of-communication-discontinuance table T2, the connection priority determination unit 29 may calculate connection priority of any other base station in the same manner.

The wireless connection control unit 31 acquires a result of the determination of the connection priority of every base station that corresponds to the position of the communication terminal 10 itself, which is sent from the connection priority determination unit 29, and information that is the setting value of the parameter (k) which corresponds to the position of the communication terminal 10 itself that is sent from the communication discontinuation frequency determination unit 27. According to the information that is the setting value of the parameter (k), the wireless connection control unit 31 selects and determines the base station, as a communication destination, to which a connection is preferentially made from a current position of the communication terminal 10 itself, using the result of the determination of the connection priority of each base station.

For example, in a case where the position of the communication terminal 10 itself is the P (X1, Y1, Z1) and where the setting value of the parameter (k) is 1, the wireless connection control unit 31 selects the base station BS1, which corresponds to "0.78" that is the greatest of "0.78", "0.29", and "0.25" in this order of connection priority, as the base station to be preferentially connected. In this case, the wireless connection control unit 31, as an example of a connection control unit, makes an attempt for a connection to the base station BS1, and, in a case where the attempt succeeds, makes a connection in a manner that possibly communicates with the base station BS1.

Furthermore, for example, in a case where the position of the communication terminal 10 itself is the P (X1, Y1, Z1) and where the setting value of the parameter (k) is 2, the wireless connection control unit 31 selects the base station BS1, which corresponds to "0.78" that is the greatest of "0.78", "0.29", and "0.25" in this order of connection priority, and the base station BS2, which corresponds to "0.29" that is the next greatest, as the base stations to be preferentially connected. In this case, the wireless connection control unit 31, as an example of the connection control unit, makes an attempt for a connection to each of the base stations BS1 and BS2, and, in a case where the attempts succeed, makes connections in a manner that possibly communicates with the base stations BS1 and BS2.

Furthermore, the wireless connection control unit 31 allocates and manages a radio resource using wireless communication with the selected base station (more precisely, one of the first connection base station 80-1 and the second connection base station 80-2, or both). These radio resources, for example, include a wireless frequency that is to be used for wireless communication, and a Resource Block (RB) of the wireless frequency. The resource block refers to a unit of allocation of wireless frequency, which results from dividing the wireless frequency (for example, a subcarrier) into a frequency axis and a time axis (for example, a time slot).

The wireless connection control unit 31 inquiries of the selected base station (more precisely, one of the first connection base station 80-1 and the second connection base station 80-2, or both) whether or not a resource block of the wireless frequency that is a candidate for allocation is allocable. Based on a wireless frequency candidate for allocation, one of the first connection base station 80-1 and the second connection base station 80-2, or both search an allocation situation of a resource block of the wireless frequency, determines whether or not the resource block is allocable, and transmits a result of the determination to the communication terminal 10. Referring to a result of the determination, the wireless connection control unit 31 determines whether or not the resource block of the wireless frequency that is the candidate for allocation is allocable. A result of the determination, for example, includes information on whether or not the resource block is allocable, or information on the resource block of the wireless frequency that is to be allocated in a case where the resource block is allocable.

Based on the result of the determination described above, the wireless connection control unit 31 allocates a resource block of the wireless frequency that is to be used for the communication with the selected base station (more precisely, one of the first connection base station 80-1 and the second connection base station 80-2, or both), which has not yet been allocated. A radio resource allocation management unit 105 may not only the resource block, but also Adaptive Modulation and Coding (AMC).

It is noted that, in a case where a wireless frequency that is the candidate for allocation, is not allocable, the wireless connection control unit 31 causes a change from the wireless frequency to a wireless connection that has next higher priority, and selects a wireless frequency from among wireless frequencies that are candidates for allocation, which have next higher priority.

The wireless connection control unit 31 sends information on the allocated radio resource (more precisely, information on a wireless frequency and a resource block that are to be used for communication with one of the first connection base station 80-1 and the second connection base station 80-2, or both) to the wireless transmission unit 35 or the wireless reception unit 39. More precisely, the wireless connection control unit 31 sends information on the allocated information uplink radio resource to the wireless transmission unit 35. The wireless connection control unit 31 sends information on the allocated downlink radio resource to the wireless reception unit 39.

The transmission packet generation unit 33 generates a packet (more precisely, a transmission packet) that is to be transmitted to one of the first connection base station 80-1 and the second connection base station 80-2, or both, using uplink data that is input. The transmission packet includes the uplink data. The uplink data (for example, the control data or the user data), for example, is obtained from the memory M1, an external device (omitted from the figure) such as a storage device, or a processing unit (omitted from the figure) for various pieces of software.

The wireless transmission unit 35, as an example of a communication unit, transmits the transmission packet (for example, the user data) generated by the transmission packet generation unit 33 to the base station that is referred to by the wireless connection control unit 31, through the transmission antenna 19 and an uplink, using the uplink radio resource allocated by the wireless connection control unit 31. It is noted that the uplink is a wireless circuit from the communication terminal 10 toward the base station that is a communication destination. The downlink is a wireless circuit from the base station that is the communication destination, to the communication terminal 10. Wireless circuits broadly include various public lines, mobile telephone lines, wide area wireless lines, and the like.

At a current position of the communication terminal 10 itself, the communication monitoring unit 37, as an example of a monitoring unit, monitors whether or not the reception packet (for example, the user data) is suitably received that is sent from one of the first connection base station 80-1 and the second connection base station 80-2, or both through the reception antenna 21. More precisely, the communication monitoring unit 37 monitors whether or not communication at the position of the communication terminal 10 itself with at least one of k base stations that are performing the communication is discontinued.

In a case where, at a current position of the communication terminal 10 itself, it is detected that the reception packet cannot be suitably received from one of the first connection base station 80-1 and the second connection base station 80-2, or both, the communication monitoring unit 37 updates the number-of-times-of-communication-discontinuance storage unit 43 with information that is the number of times of discontinuance $b_i$ relating to communication with a corresponding base station. Furthermore, in the case where, at a current position of the communication terminal 10 itself, it is detected that the reception packet cannot be suitably received from one of the first connection base station 80-1 and the second communication connection base station 80-2, or both, the communication monitoring unit 37 send a message that discontinuance of communication with the corresponding base station occurs, to the wireless connection control unit 31. When acquiring the message, for update, the wireless connection control unit 31 sets a parameter k indicating the number of concurrently-connected base stations to 2.

The wireless reception unit 39, as an example of the communication unit, receives the reception packet (for example, the user data) from one of the first connection base station 80-1 and the second connection base station 80-2, or both, through the downlink and the reception antenna 21, using the downlink radio resource allocated by the wireless connection control unit 31.

The reception packet decoding unit 41 decodes the reception data received by the wireless reception unit 39 and obtains decoding data. The decoding data includes downlink data. The downlink data (for example, the control data or the user data), for example, is sent to the memory M1, an external device (omitted from the figure) such as a storage device or a display device, or a processing unit (omitted from the figure) for various pieces of software.

Furthermore, in some cases, the downlink data includes control information relating to allocation of a radio resource. The control information is sent to the wireless connection control unit 31. The control information, for example, includes a result of determination of whether or not a radio resource (more precisely, a resource block) is allocable by the base station that is the communication destination.

Next, with reference to FIGS. 5 to 10, an operational outline example of the communication terminal 10 according to Embodiment 1 will be described by comparison with an operational outline relating to a comparative example.

Figure 5:
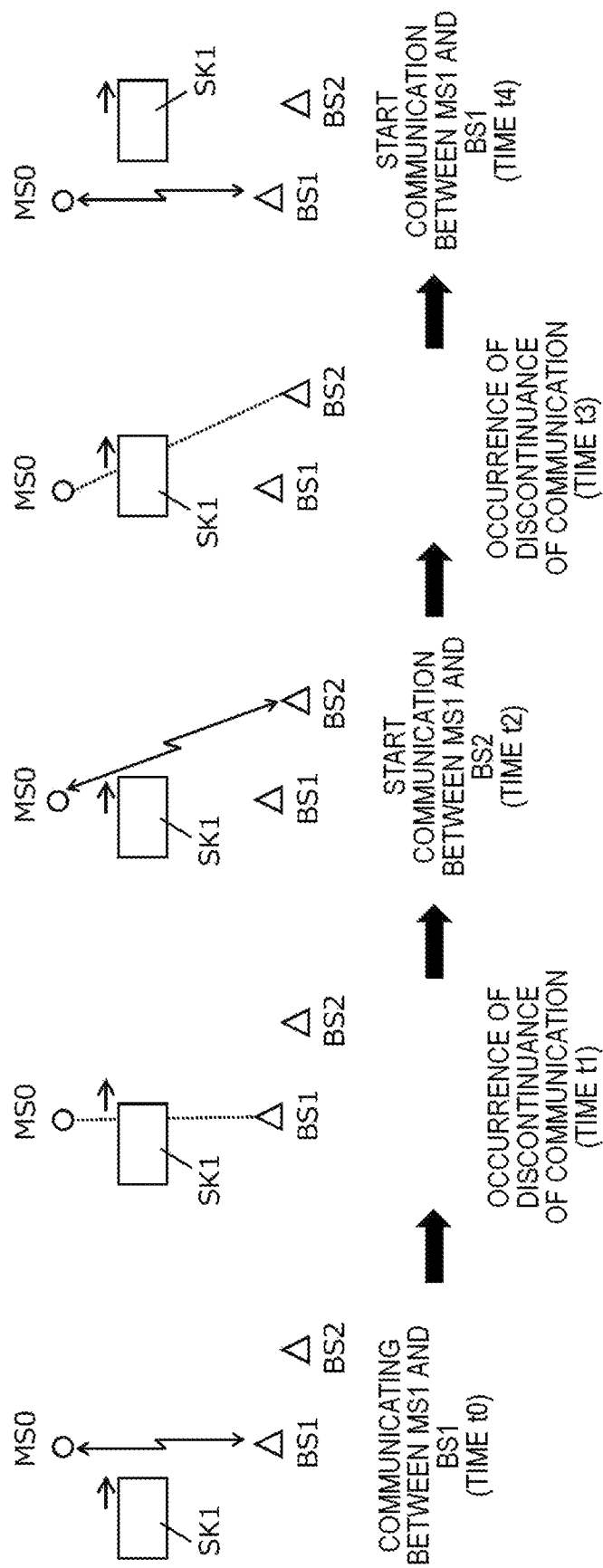
FIG. 5 is a schematic diagram for describing in time sequence an operational outline example of communication between a communication terminal and a base station relating to a comparative example.
Figure 6:
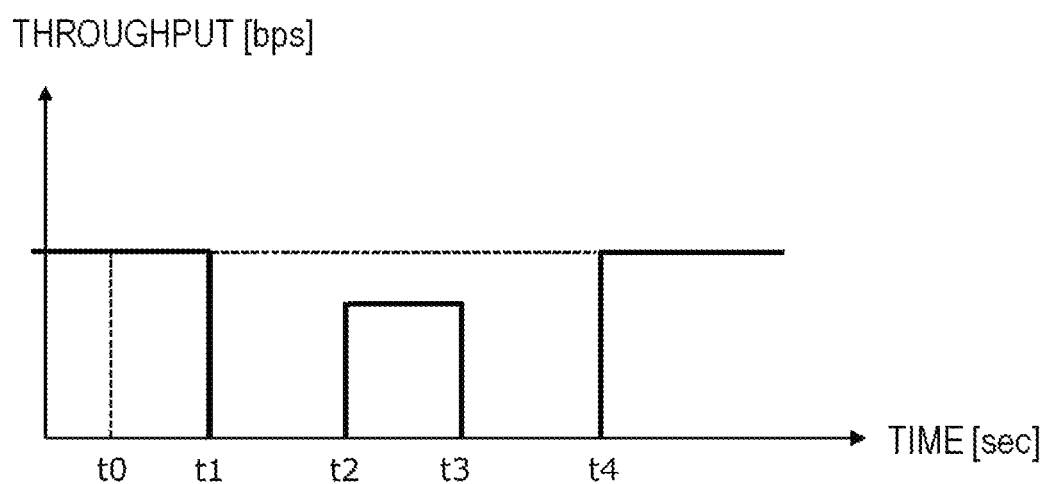
FIG. 6 is a diagram illustrating an example of transition of throughput relating to the communication by the communication terminal that is illustrated in FIG. 5.
Figure 7:
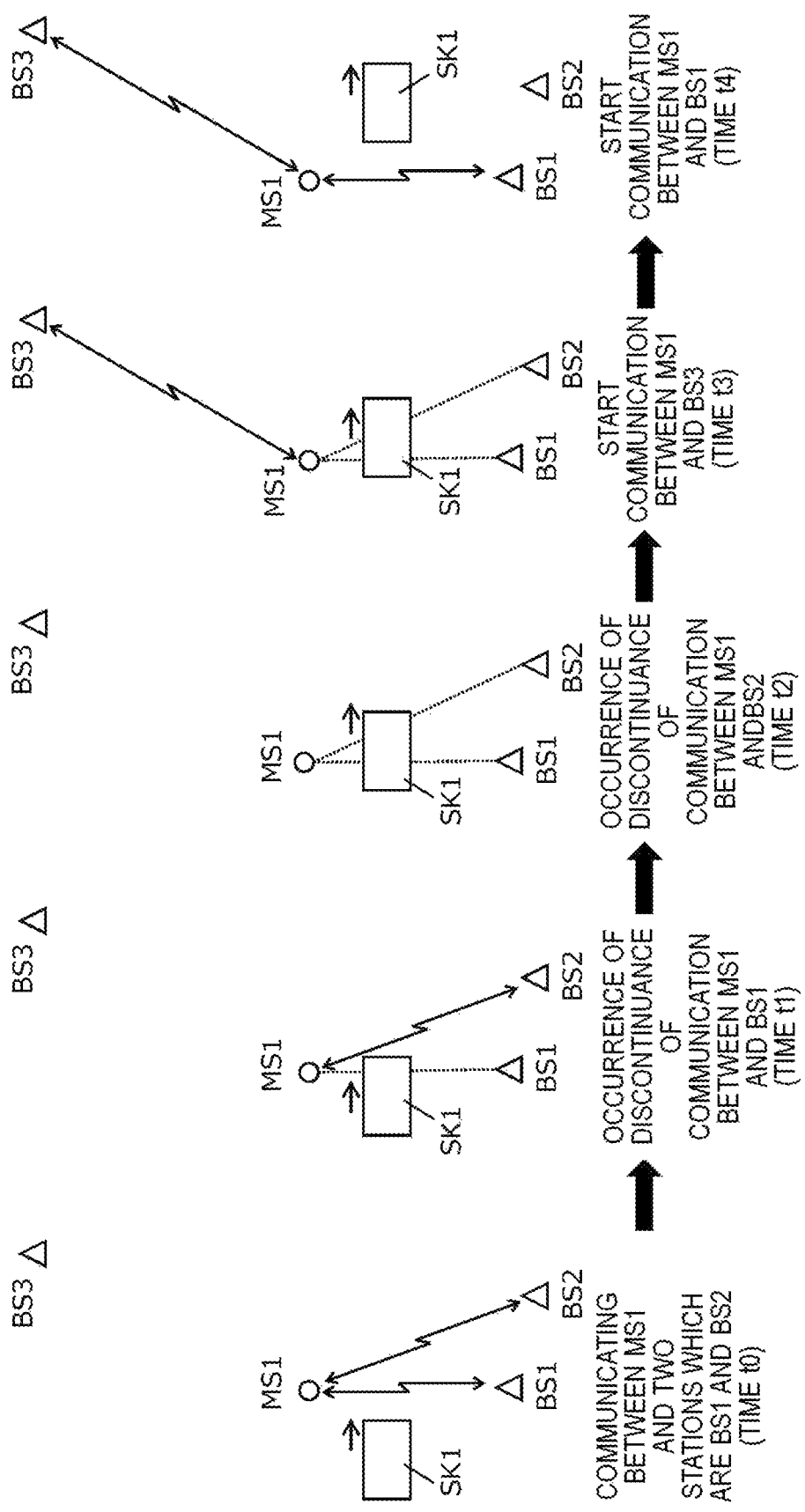
FIG. 7 is a schematic diagram for describing in time sequence a first operational outline example of communication between a communication terminal according to Embodiment 1 and a base station.
Figure 8:
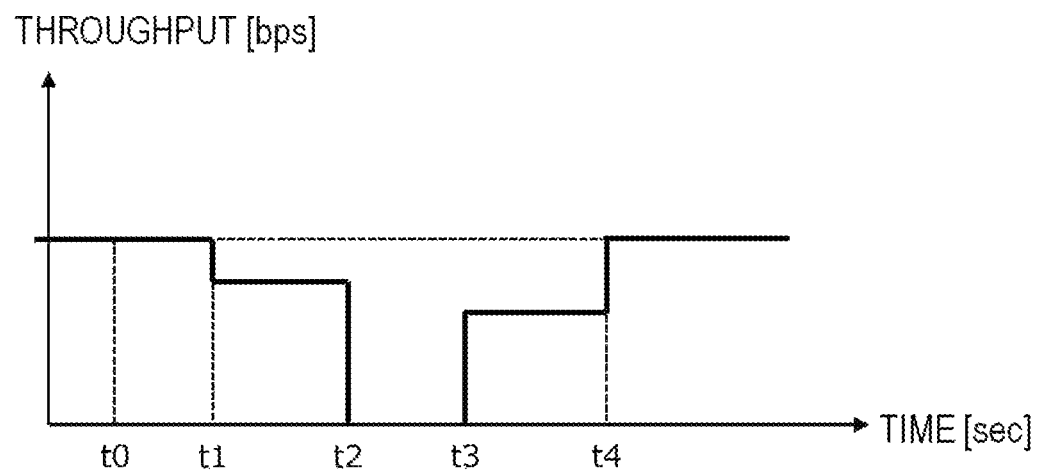
FIG. 8 is a diagram illustrating an example of transition of throughput relating to the communication by the communication terminal that is illustrated in FIG. 7.
Figure 9:
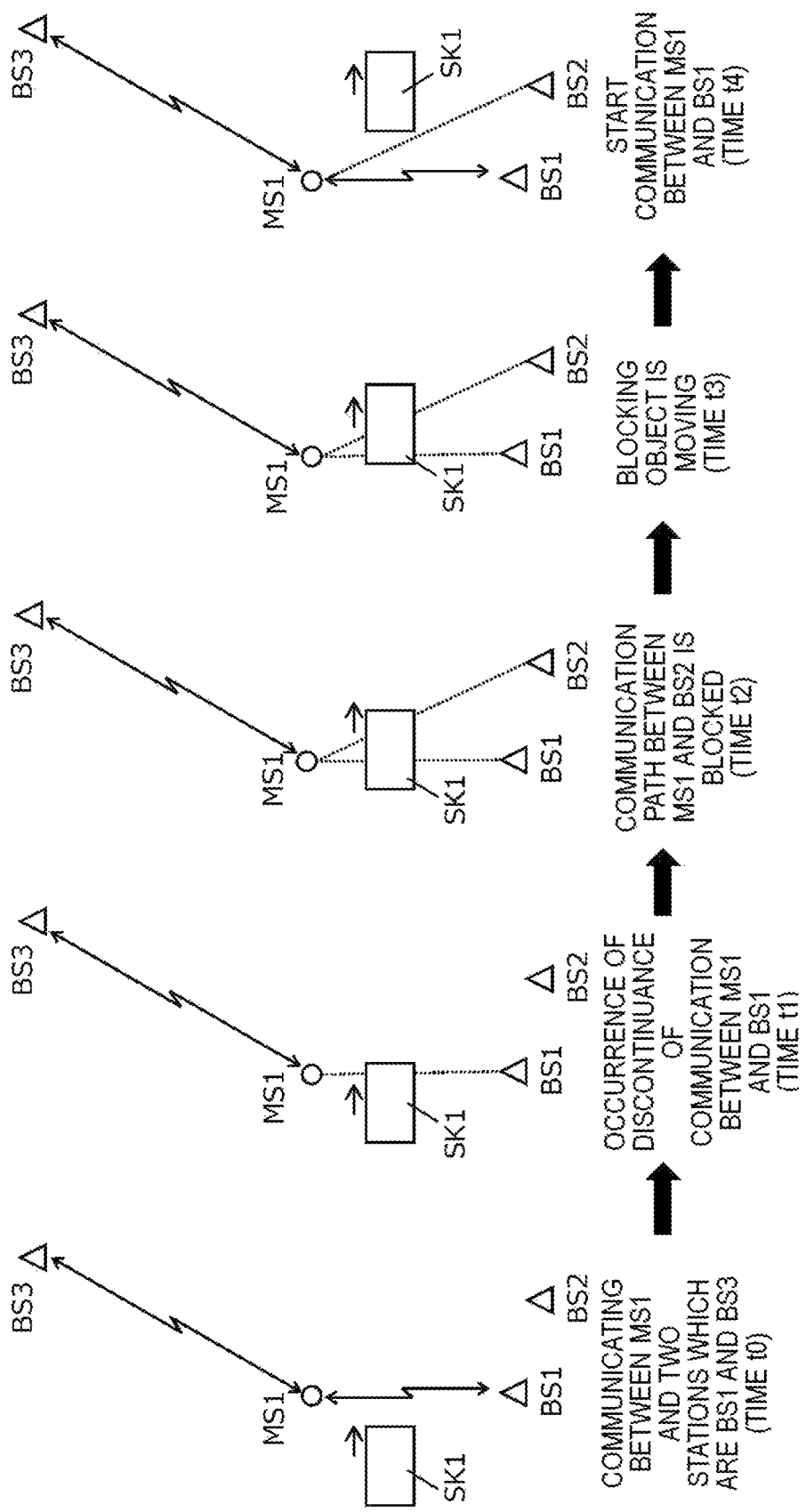
FIG. 9 is a schematic diagram for describing in time sequence a second operational outline example of the communication between the communication terminal according to Embodiment 1 and the base station.
Figure 10:
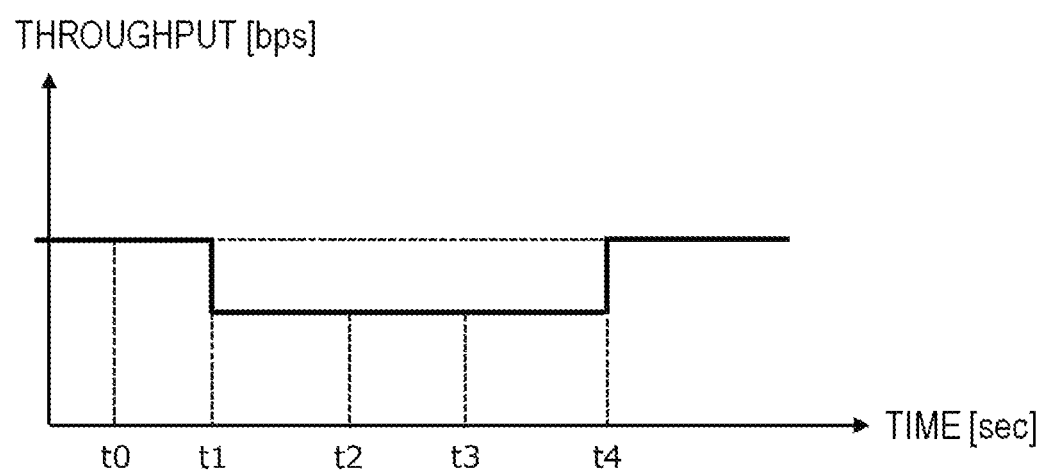
FIG. 10 is a diagram illustrating an example of transition of throughput relating to the communication by the communication terminal that is illustrated in FIG. 9.

FIG. 5 is a schematic diagram for describing in time sequence an operational outline example of communication between a communication terminal and a base station that relate to the comparative example. FIG. 6 is a diagram illustrating an example of transition of throughput relating to the communication by the communication terminal that is illustrated in FIG. 5. FIG. 7 is a schematic diagram for describing in time sequence a first operational outline example of communication between a communication terminal according to Embodiment 1 and a base station. FIG. 8 is a diagram illustrating an example of transition of throughput relating to the communication by the communication terminal that is illustrated in FIG. 7. FIG. 9 is a schematic diagram for describing in time sequence a second operational outline example of the communication between the communication terminal according to Embodiment 1 and the base station. FIG. 10 is a diagram illustrating an example of transition of throughput relating to the communication by the communication terminal that is illustrated in FIG. 9.

In FIGS. 5, 7, and 9, for easy-to-understand description, a position of each of the base stations BS1, BS2, and BS3 corresponds to an example that is illustrated in FIG. 1. Furthermore, regarding description with reference to FIG. 7, for simplification and omission, the same reference numerals as in the description with reference to FIG. 5 are used in a description that overlaps in contents with the description with reference to FIG. 5, and a description that does not overlap in contents is provided. In the same manner, regarding description with reference to FIG. 9, for simplification or omission, the same reference numerals as in the description with reference to FIG. 5 or 7 are used in a description that overlaps in contents with the description with reference to FIG. 5 or 7, and different contents are described.

In the comparative example that is illustrated in FIG. 5, a communication terminal MS0 performs the data communication with a single base station BS1 at time t0, using a high frequency band such as a millimeter wave band. At a point of time that is time t0, a blocking object SK1, such as a vehicle, that is moving, but a communication path (more precisely, a propagation path for a radio wave) between the communication terminal MS0 and the base station BS1 is not blocked. Therefore, as illustrated in FIG. 6, throughput relating to communication with the communication terminal MS0 obtains a high value that corresponds to communication with the base station BS1 which uses a high frequency such as a millimeter wave band.

However, at time t1 that is later than time t0, the blocking object SK1 has moved farther, and thus it is assumed that the blocking object SK1 blocks the communication path (more precisely, the propagation path for the radio wave) between the communication terminal MS0 and the base station BS1. In this case, as illustrated in FIG. 6, because communication between the communication terminal MS0 and the base station BS1 is blocked, the throughput relating to the communication with the communication terminal MS0 is 0.

At time t2 that is later than time t1, the communication terminal MS0 starts communication terminal with the base station BS2 (more precisely, a base station that is installed at a slightly-remoter position than the base station BS1 when viewed from a position of the communication terminal MS0) that is different from the base station BS1. At a point in time that is time t2, the objecting object SK1, such as a vehicle, is moving, but a communication path between the communication terminal MS0 and the base station BS2 (more precisely, the propagation path for the radio wave) is not blocked. Therefore, as illustrated in FIG. 6, the throughput relating to the communication with the communication terminal MS0 is lower than the throughput at time t0, but obtains a slightly-high value that corresponds to communication with the base station BS2 which uses a high frequency such as a millimeter wave band.

Moreover, at time t3 that is later than time t2, the blocking object SK1 has moved farther, and thus it is assumed that the blocking object SK1 blocks the communication paths (more precisely, the propagation paths for the radio wave) between the communication terminal MS0 and the base station BS1 and between the communication terminal MS0 and the base station BS2 at the same time. In this case, as illustrated in FIG. 6, because communication between the communication terminal MS0 and the base station BS2 is discontinued anew, the throughput relating to the communication with the communication terminal MS0 is 0.

At time t4 that is later than time t3, the blocking object SK1 moved, and thus it is assumed that the communication path (more precisely, the propagation path for the radio wave) between the communication terminal MS0 and the base station BS1 is not blocked. In this case, because the communication between the communication terminal MS0 and the base station BS1 is resumed, as illustrated in FIG. 6, in the same manner as at a point in time that is at time t0, the throughput relating to the communication with the communication terminal MS0 obtains a high value that corresponds to the communication with the base station BS1 which uses a high frequency such as a millimeter wave band.

Therefore, in a case where the number of base stations that communicates with the communication terminal MS0 is 1, at the position of the communication terminal MS0, due to the blocking object SK1, there is a high probability that discontinuance of communication will occur, and throughput relating to the communication with the communicates terminal MS0 at that time is 0.

In Embodiment 1 that is illustrated in FIG. 7, a communication terminal MS1 that has a configuration which is illustrated in FIG. 2 performs the data communication such as transmission and reception of the same user data between two stations (specifically, the base stations BS1 and BS2) at time t0, for example, using a high frequency band such as a millimeter wave band. For easy-to-understand description with reference to FIG. 7, a position of the communication terminal MS1, for example, is a position at which the number of times of discontinuance relating to the past communication with the base station BS2 is great, and positions of the base stations BS1 and BS2 are positions at which communication with the communication terminal MS1 by the base stations BS1 and BS2 is easy to discontinue at the same time at a position of the blocking object SK1. At a point in time that is time t0, the blocking object SK1, such as a vehicle, is moving, but a communication path (more precisely, the propagation path for the radio wave) between the communication terminal MS1 and each of the base stations BS1 and BS2 is not blocked. Therefore, as illustrated in FIG. 8, throughput relating to the communication with the communication terminal MS1 obtains a value that is higher than a value that corresponds to communication with each of the base stations BS1 and BS2 which use a high frequency such as a millimeter wave band.

However, at time t1 that is later than time t0, the blocking object SK1 has moved farther, and thus it is assumed that the blocking object SK1 blocks a communication path (more precisely, the propagation path for the radio wave) between the communication terminal MS1 and the base station BS1. On the other hand, the blocking object SK1 does not block a communication path (more precisely, the propagation path for the radio path) between the communication terminal MS1 and the communication with the base station BS2. In this case, as illustrated in FIG. 8, communication between the communication terminal MS1 and the base station BS1 is discontinued, but communication between the communication terminal MS1 and the base station BS2 is not discontinued. Because of this, the throughput relating to the communication with the communication terminal MS1 is lower than the throughput at time t0, but obtains a slightly-high value that corresponds to the communication with the base station BS2 which uses a high frequency band such as a millimeter wave band.

At time t2 that is later than time t1, the communication terminal MS0 starts communication terminal with the base station BS2 (more precisely, a base station that is installed at a slightly-remoter position than the base station BS1 when viewed from a position of the communication terminal MS0) that is different from the base station BS1. At a point in time that is time t2, the objecting object SK1, such as a vehicle, is moving, but a communication path between the communication terminal MS0 and the base station BS2 (more precisely, the propagation path for the radio wave) is not blocked. Therefore, as illustrated in FIG. 6, the throughput relating to the communication with the communication terminal MS0 is lower than the throughput at time t0, but obtains a slightly-high value that corresponds to communication with the base station BS2 which uses a high frequency such as a millimeter wave band.

Moreover, at time t2 that is later than time t1, the blocking object SK1 has moved farther, and thus it is assumed that the blocking object SK1 blocks the communication paths (more precisely, the propagation paths for the radio wave) between the communication terminal MS1 and the base station BS1 and between the communication terminal MS1 and the base station BS2 at the same time. In this case, as illustrated in FIG. 8, because communication between the communication terminal MS1 and the base station BS2 is discontinued anew, the throughput relating to the communication with the communication terminal MS1 is 0.

At time t3 that is later than time t2, the communication terminal MS0 starts communication terminal with the base station BS3 (more precisely, a base station that is installed at a slightly-remoter position than the base stations BS1 and BS2 when viewed from a position of the communication terminal MS1) that is different from the base stations BS1 and BS2. At a point in time that is time t3, the objecting object SK1, such as a vehicle, is moving, but a communication path between the communication terminal MS1 and the base station BS3 (more precisely, the propagation path for the radio wave) is not blocked. Therefore, as illustrated in FIG. 8, the throughput relating to the communication with the communication terminal MS1 is lower than the throughput at points in time that are time t0 and time t1, but obtains a slightly-high value that corresponds to communication with the base station BS3 which uses a high frequency such as a millimeter wave band.

At time t4 that is later than time t3, the blocking object SK1 moved, and thus it is assumed that the communication path (more precisely, the propagation path for the radio wave) between the communication terminal MS1 and the base station BS1 is not blocked. In this case, because the communication between the communication terminal MS1 and the base station BS1 is resumed, as illustrated in FIG. 8, in the same manner as at a point in time that is time t0, the throughput relating to the communication with the communication terminal MS1 obtains a value that is higher than a value which corresponds to the communication with each of the base stations BS1 and BS3 that use a high frequency such as a millimeter wave band.

Therefore, when two stations (for example, the base stations BS1 and BS2) that depend on the position of the communication terminal MS1 and thus has a high probability of being communication-discontinued at almost the same time are selected by the communication terminal 10 as multiple concurrently-connected base stations, the throughput relating to the communication with the communication terminal MS1 comes to have a probability of 0 (in other words, the discontinuance of communication).

In Embodiment 1 that is illustrated in FIG. 9, a communication terminal MS1 that has a configuration which is illustrated in FIG. 2 performs the data communication such as the transmission and reception of the same user data between two stations (specifically, the base stations BS1 and BS3) at time t0, for example, using a high frequency band such as a millimeter wave band. For easy-to-understand description with reference to FIG. 7, the position of the communication terminal MS1, for example, is a position at which the number of times of discontinuance relating to the past communication with the base station BS2 is great and is a position at which the number of times of discontinuance relating to the past communication with the base station BS3 is small (refer to FIG. 4), and the positions of the base stations BS1 and BS2 are positions at which the communication with the communication terminal MS1 by the base stations BS1 and BS2 is easy to discontinue at the same time at the position of the blocking object SK1. At time t0, the blocking object SK1, such as a vehicle, that is moving, but the communication path (more precisely, the propagation path for the radio wave) between the communication terminal MS1 and each of the base stations BS1 and BS3 is not blocked. Therefore, as illustrated in FIG. 10, the throughput relating to the communication with the communication terminal MS1 obtains a value that is higher than a value which corresponds to the communication with each of the base stations BS1 and BS3 that use a high frequency band such as a millimeter wave band.

However, at time t1 that is later than time t0, the blocking object SK1 has moved farther, and thus it is assumed that the blocking object SK1 blocks a communication path (more precisely, the propagation path for the radio wave) between the communication terminal MS1 and the base station BS1. On the other hand, the blocking object SK1 does not block the communication path (more precisely, the propagation path for the radio path) between the communication terminal MS1 and the communication with the base station BS3. In this case, as illustrated in FIG. 10, the communication between the communication terminal MS1 and the base station BS1 is discontinued, but communication between the communication terminal MS1 and the base station BS3 is not discontinued. Because of this, the throughput relating to the communication with the communication terminal MS1 is lower than the throughput at time t0, but obtains a slightly-high value that corresponds to the communication with the base station BS3 which uses a high frequency band such as a millimeter wave band.

Furthermore, at time t2 that is later than time t1, the blocking object SK1 has moved farther, and thus it is assumed that the blocking object SK1 blocks a communication path (more precisely, the propagation path for the radio wave) that is used in a case where the communication terminal MS1 and the base station BS2 are supposed to perform communication. On the other hand, the blocking object SK1 does not block the communication path (more precisely, the propagation path for the radio path) between the communication terminal MS1 and the communication with the base station BS3. In this case, as illustrated in FIG. 10, the blocking object SK1 blocks together the communication paths between the communication terminal MS1 and the base stations BS1 and between the communication terminal MS1 and the base stations BS2, but the communication between the communication terminal MS1 and the base stations BS3 is not discontinued. Because of this, the same throughput as at time t1, is obtained as the throughout relating to the communication with the communication terminal MS1.

Furthermore, at time t3 that is later than time t2, the blocking object SK1 has moved farther, and thus, the blocking object SK1 keeps blocking the communication path (more precisely, the propagation path for the radio wave) that is used in the case where the communication terminal MS1 and the base station BS2 are supposed to perform communication. On the other hand, the blocking object SK1 does not block the communication path (more precisely, the propagation path for the radio path) between the communication terminal MS1 and the communication with the base station BS3. In this case, as illustrated in FIG. 10, the blocking object SK1 blocks together the communication paths between the communication terminal MS1 and the base stations BS1 and between the communication terminal MS1 and the base stations BS2, but the communication between the communication terminal MS1 and the base stations BS3 is not discontinued. Because of this, the same throughput as at time t1, as is, is obtained as the throughout relating to the communication with the communication terminal MS1.

At time t4 that is later than time t3, the blocking object SK1 moved, and thus it is assumed that the communication path (more precisely, the propagation path for the radio wave) between the communication terminal MS1 and the base station BS1 is not blocked. In this case, because the communication between the communication terminal MS1 and the base station BS1 is resumed, as illustrated in FIG. 10, in the same manner as at a point in time that is time t0, the throughput relating to the communication with the communication terminal MS1 obtains a value that is higher than a value which corresponds to the communication with each of the base stations BS1 and BS3 that use a high frequency such as a millimeter wave band.

Therefore, two stations (for example, the base stations BS1 and BS3) that depend on the position of the communication terminal MS1 and thus has a low probability of being communication-discontinued at almost the same time are selected by the communication terminal 10 as multiple concurrently-connected base stations, and thus the throughput relating to the communication with the communication terminal MS1 can be decreased remarkably in a manner that has a probability of 0 (in other words, the discontinuance of communication).

Next, a specific operational procedure that is to be executed when the communication terminal 10 according to Embodiment 1 is positioned in the communication area AR1 will be described with reference to FIG. 11.

Figure 11:
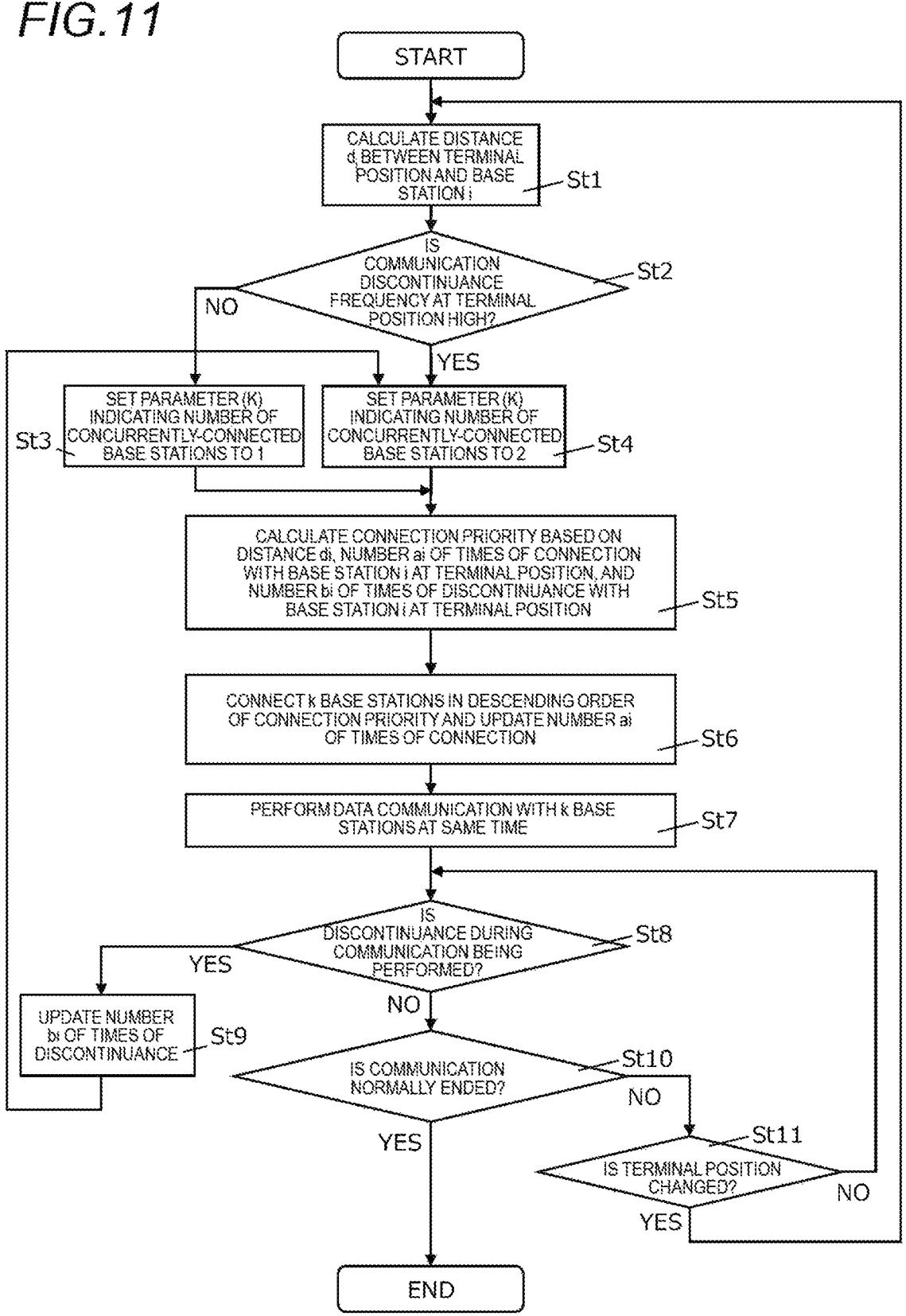
FIG. 11 is a flowchart for describing in time sequence an example of an operational procedure for the communication terminal according to Embodiment 1.

FIG. 11 is a flowchart for describing in time sequence an example of an operational procedure for the communication terminal 10 according to Embodiment 1. Each processing operation (step) that is illustrated in FIG. 11 is performed, for the most part, by the processor PRC1 of the communication terminal 10. The presupposition of a description of each processing operation in FIG. 11 is that the processor PRC1 of the communication terminal 10 acquires the position information on the communication terminal 10 itself at all times or periodically.

In FIG. 11, the processor PRC1 calculates the distance $d_i$ to every base station that is a distance between the position P (X1, Y1, Z1) that corresponds to the acquired position information on the communication terminal 10 itself and the position $(X_i, Y_i, Z_i)$ of the base stations BSi that is installed within the communication area AR1 (St1). The processor PRC1 reads and acquires the information that is the number of times of discontinuance relating to the past communication with every base station at the position P (X1, Y1, Z1) which corresponds to the acquired position information on the communication terminal 10 itself, from the number-of-times-of-communication-discontinuance storage unit 43. According to whether or not the average value or maximum value of the acquired number of times of discontinuance relating to the communication with every base station is equal to or higher than a prescribed value (for example, 5), the processor PRC1 determines whether or not the communication at the position of the communication terminal 10 itself (for example, the communication that uses a millimeter wave or the like which has the enhanced ability of a radio wave to propagate in a straight line) is performed in the place where the discontinuance occurs easily (St2).

In the case where it is determined that the average value or maximum value of the number of times of discontinuance described above is lower than the prescribed value (for example, 5) (NO in St2), the processor PRC1 sets the parameter (k) indicating the number of concurrently-connected base stations to 1 (St3).

In the case where it is determined that the average value or maximum value of the number of times of discontinuance described above is equal to or higher than the prescribed value (for example, 5) (YES in St2), the processor PRC1 sets the parameter (k) indicating the number of concurrently-connected base stations to 2 (St4).

The processor PRC1 reads and acquires the information that is the number of times of connection relating to the past communication with every base station at the position P (X1, Y1, Z1) which corresponds to the position information on the communication terminal 10 itself, from the number-of-times-of-connection storage unit 45. The processor PRC1 reads and acquires the information that is the number of times of discontinuance relating to the past communication with every base station at the position P (X1, Y1, Z1) which corresponds to the position information on the communication terminal 10 itself, from the number-of-times-of-communication-discontinuance storage unit 43.

The processor PRC1 calculates the connection priority for preferentially making a connection to each base station from the position of the communication terminal 10 itself, based on the result of the calculation of the distance $d_i$ to every base station, which is calculated in Step St1, and on the number $a_i$ of times of connection and the number $b_i$ of times of discontinuance, which relate to the past communication with every base station at a current position P (X1, Y1, Z1) of the communication terminal 10 itself (St5).

The processor PRC1 acquires the result of the determination of the connection priority of every base station that corresponds to the position of the communication terminal 10 itself calculated in Step St5, and the information that is the setting value off the parameter (k) that corresponds to the position of the communication terminal 10 itself, which is equivalent to in Step St3 or Step St4. According to the information that is the setting value of the parameter (k), the processor PRC1 selects and determines the base station, as the communication destination, to which a connection is preferentially made from a current position of the communication terminal 10 itself, using the result of the determination of the connection priority of every base station. The processor PRC1 not only makes a connection to the determined base station (St6), but also sends the number $a_i$ of times of connection relating the communication with the base station to the number-of-times-of-communication-connection storage unit 45 for storage (update) (St6).

Subsequent to Step St6, the communication terminal 10 starts and performs at the same time the data communication with one of the first connection base station 80-1 and the second connection base station 80-2, which are connected for communication at Step St6, or both (St7).

At this point, it is detected by the processor PRC1 whether or not the discontinuance of the communication with at least one base station occurs due to a blocking object (for example, the blocking object SK1 that is illustrated in FIGS. 7 and 9), such as a vehicle, while the communication with the base station (more precisely, one of the first connection base station 80-1 and the second connection base station 80-2, or both) that starts the communication at Step St7 is being performed (St8).

In a case where it is detected that the discontinuance of the communication with at least one base station that is performing communication occurs (YES in St8), the processor PRC1 sends the number $b_i$ of times of discontinuance relating to the communication with the base station to the number-of-times-of-communication-discontinuance storage unit 43 for storage (update) (St9). Thereafter, when performing subsequent communication, the processor PRC1 sets the parameter (k) indicating the number of concurrently-connected base stations to 2 (St4). Processing operations in Step St4 and subsequent steps are as described above, and therefore, descriptions thereof are omitted.

On the other hand, in a case where it is detected that the discontinuance of the in-progress communication with at least one base station does not occur (NO in St8), if the communication with each of all the base stations that are performing communication is normally ended (YES in St10), processing by the communication terminal 10, which is illustrated in FIG. 11 is ended. However, in a case where the communication with each of all the base stations that are performing communication is not ended (NO in St10), the processor PRC1 detects whether or not there is a change of a prescribed distance or longer in the position information on the communication terminal 10 itself due to movement of the communication terminal 10 (St11). In a case where it is detected that there is a change of less than a prescribed distance in the position information on the communication terminal 10 itself (NO in St11), the processing by the communication terminal 10 returns to Step St8 and processing operations in Step St8 and subsequent steps are performed.

On the other hand, in a case where it is detected that there is a change of prescribed distance or longer in the position information on the communication terminal 10 itself (YES in St11), the processing by the communication terminal 10 returns to Step St1 and processing operations in Step St1 and subsequent steps are performed.

As described above, in the communication system 100 according to Embodiment 1, the communication terminal 10 possibly performs communication with each of i (for example, i=10) base stations BS, the base stations BS1 and BS10, and acquires the position information on the communication terminal 10 itself. The communication terminal 10 accumulates the connection frequency information and the continuation frequency information, which relate to the communication with each of the i base stations at the position of the communication terminal 10 itself in the memory M1. Based on the connection frequency information and the discontinuance frequency information at the position of the communication terminal 10 itself, which corresponds to the acquired position information, the communication terminal 10 determines the connection priority for preferentially making a connection to each of the i base stations from the position of the communication terminal 10 itself. The communication terminal 10 controls connections to k (for example, k=1 or k 2) base stations in a descending order of the determined connection priority. The communication terminal 10 performs the data communication with each of the k base stations.

Accordingly, in the communication in a high frequency band, such a 28 GHz band, that is considered as being allocated to a millimeter wave that has the enhanced ability of a radio wave to propagate in a straight line, or the 5-th mobile communication system (5G), according to the position of the communication terminal 10 itself, the communication terminal 10 obtains the connection priority of every base station to be preferentially connected, taking into account the connection frequency and the discontinuance frequency that relate to communication, and because of this, can adaptively select the base station in which the continuance of communication seldom occurs. Therefore, when performing the communication terminal in the high frequency band described above, the communication terminal 10 has an increasing probability of being able to continue the communication with the base station in which the continuance of communication seldom occurs, and can suppress an increase in throughput that accompanies the continuance of communication, thereby ensuring continuance of suitable communication.

Furthermore, the communication terminal 10 establishes a connection between the communication terminal 10 itself and each of the k base stations, and then, the connection frequency at the position of the communication terminal 10 itself is updated in a manner that is associated with each of the k base stations. Accordingly, the communication terminal 10 suitably updates the information that is the number of times of connection for communication, depending on the position of the communication terminal 10 itself, and, when performing the communication in the high frequency band described above, can adaptively select the base station in which the discontinuance of communication seldom occurs.

Furthermore, the communication terminal 10 calculates the position of the communication terminal 10 itself, which corresponds to the acquired position information, and the distance to each of the i base stations. Based on the connection frequency information and the discontinuance frequency information at the position of the communication terminal 10 itself, and on a result of calculation a distance between the position of the communication terminal 10 itself and each of the i base stations, the communication terminal 10 determines the connection priority of each of the i base stations. Accordingly, according to the position of the communication terminal 10 itself, the communication terminal 10 obtains the connection priority of every base station, collectively taking into account the distance with the base station, which exerts an influence on throughput, and both the connection frequency and the discontinuance frequency, which relate to the communication, and because of this, can select more adaptively the base station in which the discontinuance of communication seldom occurs.

Furthermore, based on the discontinuance frequency information at the position of the communication terminal 10 itself, the communication terminal 10 derives a value of the parameter (k) indicating the number of concurrently-connected base stations. Accordingly, the communication terminal 10 can suitably determine whether or not a current position of the communication terminal 10 itself is a position at which the discontinuance of the communication with the base station frequently occurred in the past, and can make a suggestion as to how many base stations may be connected when performing communication at the position.

Furthermore, in a case where the discontinuance frequency (for example, the average value or maximum value of the number of times of discontinuance) at the position of the communication terminal 10 itself is at or above a prescribed value, the communication terminal 10 derives the value of the parameter (k) indicating the number of concurrently-connected base stations to 2. Accordingly, the communication terminal 10 sets a current position of the communication terminal 10 itself to be a position at which the discontinuance of the communication with the base station frequently occurred in the past, and makes connections to multiple base stations at the same time in a fail-safe manner. Thus, the communication terminal 10 can suppress a decrease in throughput to zero (more precisely, the discontinuance of communication) at the time of communication from occurring, in comparison with a case where only a single base station is connected.

Furthermore, in a case where the discontinuance frequency (for example, the average value or maximum value of the number of times of discontinuance) at the position of the communication terminal 10 itself is below the prescribed value, the communication terminal 10 derives the value of the parameter (k) indicating the number of concurrently-connected base stations to 1. Accordingly, the communication terminal 10 sets a current position of the communication terminal 10 itself to be a position at which the discontinuance of the communication with the base station frequently occurred in the past, and can determine that if a connection to a single base station is made, sufficient throughout is obtained, and can perform suitable communication that is difficult to discontinue.

Furthermore, the communication terminal 10 monitors whether or not communication at the position of the communication terminal 10 itself with at least one of the k base stations that are performing the communication is discontinued. When the discontinuance of the communication at the position of the communication terminal 10 itself is detected, the communication terminal 10 derives the value of the parameter (k) indicating the number of concurrently-connected base stations to 2. Accordingly, because the communication terminal 10 itself is not present at a position at which the discontinuance occurs while communication is being performed, the communication terminal 10 makes connections to multiple base stations at the same time in a fail-safe manner, and thus can be prepared to perform stable communication that is difficult to discontinue.

Furthermore, the communication terminal 10 detects the discontinuance of the communication at the position of the communication terminal 10 itself, and then updates the discontinuance frequency information at the position of the communication terminal 10 itself in a manner that is associated with at least one of the k base stations. Accordingly, the communication terminal 10 suitably updates the information that is the number of times of discontinuance of communication, depending on the position of the communication terminal 10 itself, and, when performing the communication in the high frequency band described above, can adaptively make a selection in such a manner that the base station in which the discontinuance of communication occurs easily is avoided.

Furthermore, in a case where the communication terminal 10 itself moved a prescribed distance or longer, based on the connection frequency information and the discontinuance frequency information at the position of the communication terminal 10 itself, which corresponds to the acquired position information, the communication terminal 10 determines the connection priority of each of the i base stations, which corresponds to the position of the communication terminal 10 itself. Accordingly, in a case where, as a result of movement or the like of the user who carries the communication terminal 10 itself with him/her, the communication terminal 10 is positioned at a prescribed distance or longer away from a current position, the communication terminal 10 can select the base station that has to be preferentially connected anew at the position according to the post-movement position. Because of this, in a case where the communication terminal 10 itself moved a long distance, the communication terminal 10 can also continuously perform stable communication.

Various embodiments are described above with reference to the accompanying drawings, but the present disclosure is not limited to such examples. It is apparent to a person of ordinary skill in the related art that various modification examples, revision examples, replacement examples, addition examples, deletion example, and equivalent examples are contemplated, and it is understood that these also belong to the technical scope of the present disclosure. Furthermore, the constituent elements in the various embodiments, which are described above, may be arbitrarily combined within the scope that does not depart from the gist of the invention.

The present disclosure is useful in implementing a communication terminal and a communication method that adaptively select a base station in which discontinuance of the communication seldom occurs, suppresses a decrease in throughput that accompanies the discontinuance of the communication, and ensures continuance of suitable communication, according to a position of the communication terminal itself, in communication in a high frequency band.

This application is based on and claims the benefit of the Japanese patent application No. 2018-157647 filed on Aug. 24, 2018, the contents of which are incorporated herein by reference in its entirety.

What is claimed is:

1. A communication terminal that is configured to communicate with i base stations, where i is an integer that is equal to or greater than 2, the communication terminal comprising:
   a memory storing instructions; and
   a processor configured to implement the instructions and execute a plurality of tasks, including:
   a position acquisition task that acquires position information of the communication terminal;
   an accumulation task that accumulates connection frequency information and disconnection frequency information that relate to communication with each of the i base stations at a position of the communication terminal;
   a distance calculation task that calculates a distance between the position of the communication terminal that corresponds to the acquired position information, and each of the i base stations;
   a determination task that determines a connection priority for preferentially making a connection to each of the i base stations from the position of the communication terminal, based on the connection frequency information and the disconnection frequency information at the position of the communication terminal that corresponds to the acquired position information of the communication terminal and based on a result of the calculation of the distance between the position of the communication terminal and each of the i base stations;
   a connection control task that controls a connection to each of k base stations, in a descending order of the determined connection priorities, where k is an integer that satisfies $1 \leq k \leq i$;
   a communication task that performs data communication with the k base stations; and
   a number-of-connection-base-stations setting task that derives a value of k as 2 or greater than 2 in a case where disconnection frequency at the position of the communication terminal is above a predetermined value.

2. The communication terminal according to claim 1, wherein the connection control task establishes a connection between the communication terminal and each of the k base stations, and then updates the connection frequency information at the position of the communication terminal, in a manner that is associated with each of the k base stations.

3. The communication terminal according to claim 1, wherein the number-of-connection-base-stations setting task derives the value of k as 1 in a case where the disconnection frequency at the position of the communication terminal is below the predetermined value.

4. The communication terminal according to claim 1, wherein the processor further executes
   a monitoring task that monitors whether or not communication at the position of the communication terminal with at least one of the k base stations that are performing communication is discontinued, and
   wherein the number-of-connection-base-stations setting task derives the value of k as 2 or greater than 2 when the disconnection of the communication at the position of the communication terminal is detected.

5. The communication terminal according to claim 4, wherein the monitoring task detects the disconnection of the communication at the position of the communication terminal, and then updates the disconnection frequency information at the position of the communication terminal in a manner that is associated with at least one of the k base stations.

6. The communication terminal according to claim 1, wherein, in a case where the communication terminal moves a predetermined distance or longer, the determination task determines the connection priority of each of the i base stations based on the connection frequency information and the disconnection frequency information at the position of the communication terminal that corresponds to the acquired position information.

7. A communication method in a communication terminal that is configured to communicate with i base stations, where i is an integer that is equal to or greater than 2, the communication method comprising:
   acquiring position information of the communication terminal;
   accumulating connection frequency information and disconnection frequency information that relate to communication with each of the i base stations at a position of the communication terminal;
   calculating a distance between the position of the communication terminal that corresponds to the acquired position information, and each of the i base stations;
   determining a connection priority for preferentially making a connection to each of the i base stations from the position of the communication terminal, based on the connection frequency information and the disconnection frequency information at the position of the communication terminal that corresponds to the acquired position information of the communication terminal and based on a result of the calculation of the distance between the position of the communication terminal and each of the i base stations;

controlling a connection to each of k base stations, in a descending order of the determined connection priorities, where k is an integer that satisfies $1 \leq k \leq i$;

performing data communication with the k base stations; and deriving a value of k as 2 or greater than 2 in a case where disconnection frequency at the position of the communication terminal is above a predetermined value.

\* \* \* \* \*